United States Patent
Adams et al.

(10) Patent No.: US 11,680,660 B2
(45) Date of Patent: Jun. 20, 2023

(54) BALL VALVE HANDLE, SPRING LOADED

(71) Applicant: Raytheon Company, Waltham, MA (US)

(72) Inventors: Richard J. Adams, Charlestown, MA (US); Gordon O. Salmela, Framingham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/454,131

(22) Filed: Nov. 9, 2021

(65) Prior Publication Data
US 2023/0147345 A1    May 11, 2023

(51) Int. Cl.
*F16K 31/56*    (2006.01)
*F16K 5/06*    (2006.01)
*F16F 1/02*    (2006.01)

(52) U.S. Cl.
CPC ............ *F16K 31/563* (2013.01); *F16F 1/025* (2013.01); *F16K 5/0647* (2013.01); *F16F 2234/00* (2013.01); *F16K 2200/305* (2021.08)

(58) Field of Classification Search
CPC .... F03G 1/00; F03G 1/02; F03G 1/026; F16F 1/025; F16F 1/18; F16F 1/185; F16F 2236/08; F16F 2236/085; F16F 2234/00; F16K 5/0647; F16K 31/563; F16K 31/602; F16K 35/027; F16K 2200/305; F16K 2200/3051; F16K 2200/3053
USPC ....... 251/75, 95, 98, 99, 101–116, 242, 244, 251/303, 337; 267/154, 155
See application file for complete search history.

(56) References Cited

U.S. PATENT DOCUMENTS

| | | | | |
|---|---|---|---|---|
| 32,444 A | * | 5/1861 | Bolle | F16K 5/0647 251/305 |
| 679,247 A | * | 7/1901 | Whiting | B62D 5/097 251/207 |
| 3,344,397 A | * | 9/1967 | Elliott | G01V 1/181 367/189 |
| 3,964,728 A | * | 6/1976 | Flider | F16K 31/563 251/313 |
| 4,779,840 A | | 10/1988 | Andrea | |
| 4,938,453 A | | 7/1990 | Blanchard | |
| 5,525,845 A | * | 6/1996 | Beale | F02G 1/0435 310/90 |
| 6,050,286 A | | 4/2000 | Kruer et al. | |

(Continued)

FOREIGN PATENT DOCUMENTS

| | | |
|---|---|---|
| CA | 2461300 A1 | 9/2005 |
| CN | 202158252 U | 3/2012 |

(Continued)

OTHER PUBLICATIONS

International Search Report and Written Opinion for PCT Application No. PCT/US2022/075114, dated Nov. 21, 2022, pp. 15.

*Primary Examiner* — Kenneth Rinehart
*Assistant Examiner* — Jonathan J Waddy
(74) *Attorney, Agent, or Firm* — Kinney & Lange, P. A.

(57) ABSTRACT

A spring-loaded ball valve includes a spring, a first pin, a second pin, and a handle. The spring is configured to apply pressure to the first pin and second pin when the ball valve is in both the fully open and fully closed positions. The spring applies maximum torque when the ball valve is in the fully open or fully closed position to ensure the valve remains in the fully open or fully closed position.

16 Claims, 5 Drawing Sheets

(56) References Cited

U.S. PATENT DOCUMENTS

| | | | | |
|---|---|---|---|---|
| 6,170,798 | B1* | 1/2001 | Johnson | G01M 3/18 |
| | | | | 251/68 |
| 7,078,832 | B2* | 7/2006 | Inagaki | H02K 7/14 |
| | | | | 335/238 |
| 8,960,655 | B2* | 2/2015 | Wood | F02G 1/0435 |
| | | | | 267/159 |
| 2009/0094977 | A1* | 4/2009 | Hill | F02G 1/0435 |
| | | | | 60/520 |
| 2016/0290427 | A1* | 10/2016 | Huang | F16F 3/00 |
| 2017/0255189 | A1* | 9/2017 | Barton | G05B 19/0426 |
| 2018/0094686 | A1 | 4/2018 | Wang | |
| 2019/0160658 | A1* | 5/2019 | Hutter | A61H 3/00 |
| 2020/0408328 | A1 | 12/2020 | Schwarzbek et al. | |

FOREIGN PATENT DOCUMENTS

| | | |
|---|---|---|
| EP | 0985846 A1 | 3/2000 |
| EP | 3054188 A1 | 8/2016 |
| FR | 3033416 A1 | 9/2016 |
| JP | S6165925 A | 4/1986 |

* cited by examiner

BALL VALVE HANDLE, SPRING LOADED

STATEMENT OF GOVERNMENT INTEREST

This invention was made with government support under contracts HQ0147-18-D-0001 and CLS-D0001-20-017 awarded by United States Missile Defense Agency. The government has certain rights in the invention.

BACKGROUND

The present invention relates to a ball valve and, more particularly, to a ball valve with an improved spring used in a ball valve assembly.

A ball valve is a fluid flow control device which uses a hollow pivoting ball to control liquid flowing through the valve. It is open when the ball's hole or aperture is in line with the flow inlet and closed when the ball is pivoted 90-degrees by the valve handle, blocking the fluid flow. There are many different types of ball valves, but each is used to allow or prevent fluid from flowing through the ball valve. Some previous ball valves include a spring that is utilized to continuously force the ball valve into the closed position, such that the valve is open only when an operator holds the valve in the open position. Further, previous ball valves do not include features that ensure the valve is forced to either the fully open or fully closed positions during use of the valve.

SUMMARY

According to one aspect of the disclosure, a ball valve assembly includes a base, a first pin, a second pin, a handle, and a spring. The first pin and the second pin extend perpendicular to a top surface of the base. The handle is positioned adjacent and coupled to the base. The spring includes a first coupler, a second coupler, and a continuous curved portion extending between and connecting the first coupler to the second coupler. The first coupler is coupled to the first pin and the second coupler is coupled to the second pin. The continuous curved portion has a variable thickness.

According to another aspect of the disclosure, a spring for use in an assembly is disclosed. The spring includes a first coupler positioned at a first end of the spring, a second coupler positioned at a second end of the spring, and a continuous curved portion extending between and connecting the first coupler to the second coupler. The continuous curved portion has a variable thickness between the first coupler and the second coupler.

DETAILED DESCRIPTION

Figure 1A:
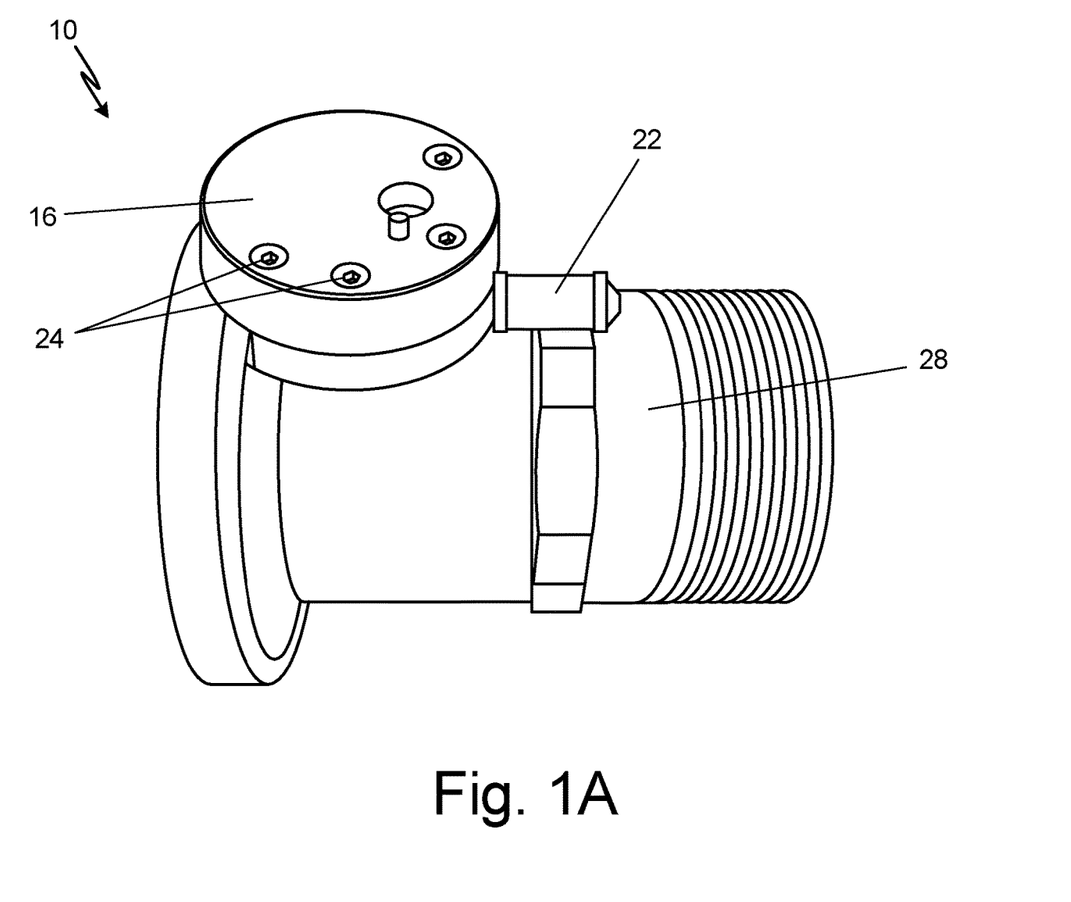
FIG. 1A is a perspective view of a representative ball valve.
Figure 1B:
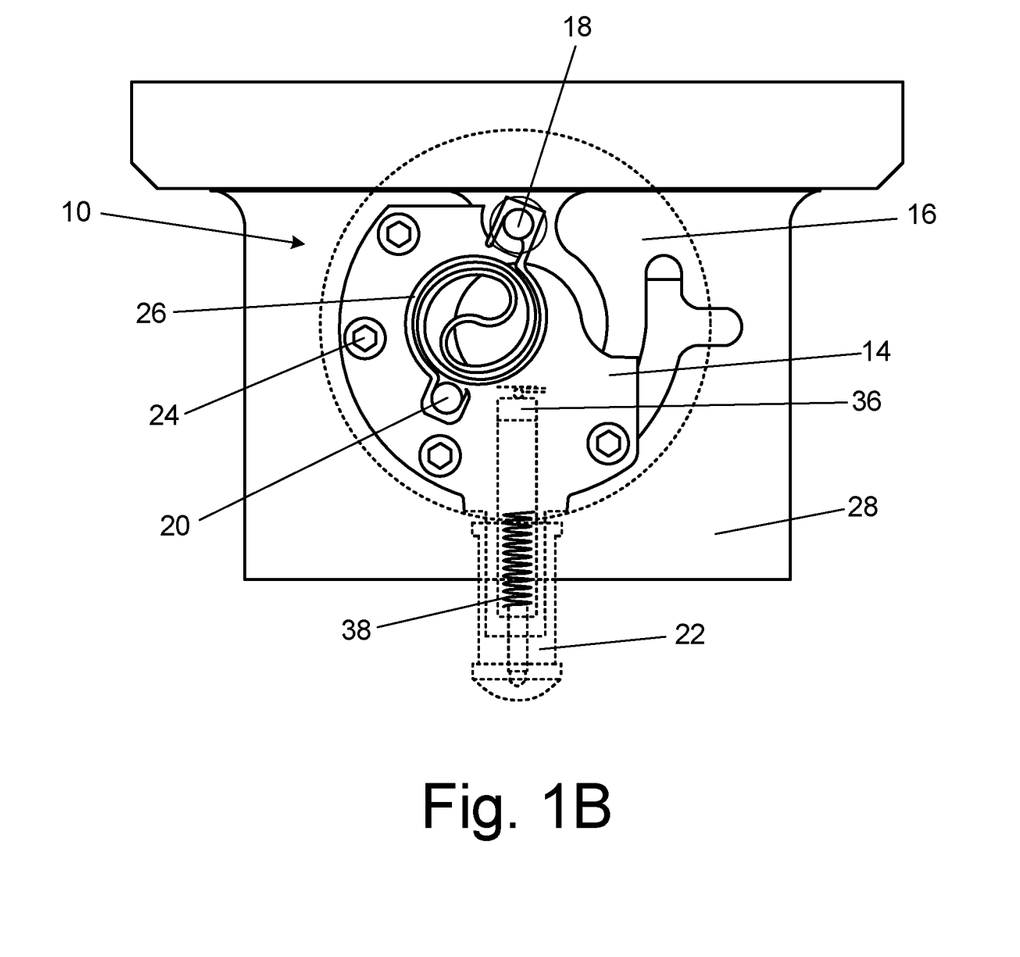
FIG. 1B is a top view of the ball valve with some components shown transparent.
Figure 1C:
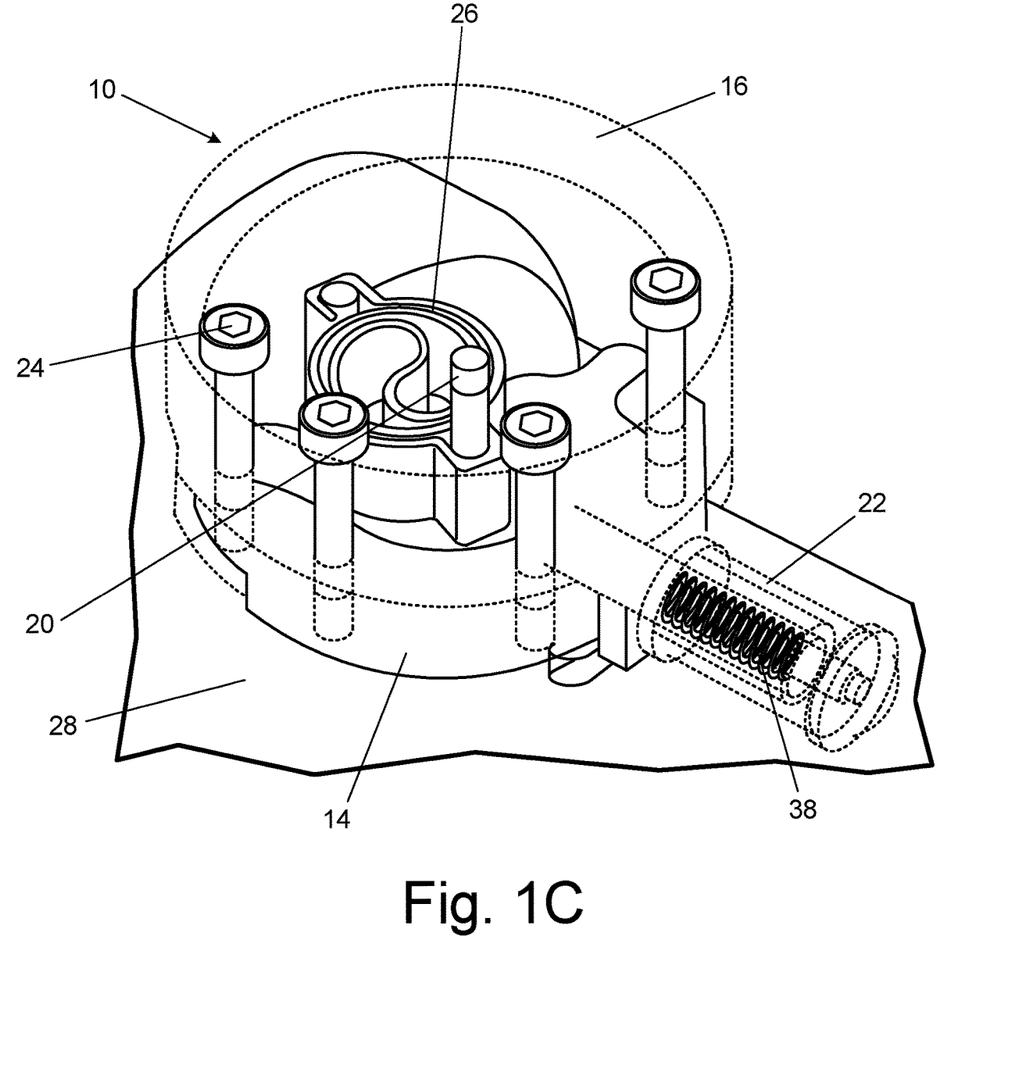
FIG. 1C is a perspective view of the ball valve with some components shown transparent.
Figure 1D:
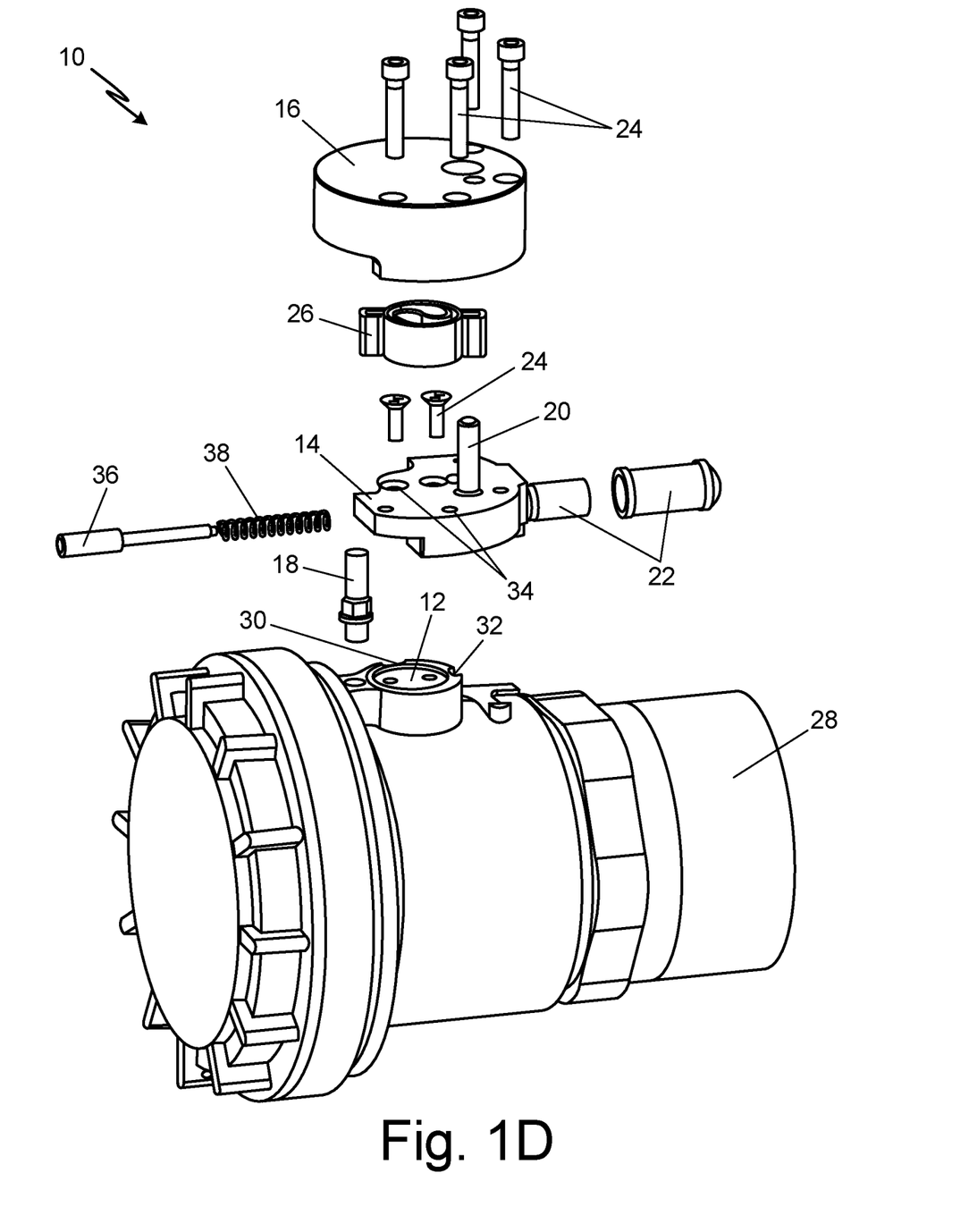
FIG. 1D is an exploded perspective view of the ball valve of FIGS. 1A-1C.

FIG. 1A is a perspective view of ball valve 10. FIG. 1B is a top view of ball valve 10 with some components shown transparent. FIG. 1C is a perspective view of ball valve 10 with some components shown transparent. FIG. 1D is an exploded perspective view of ball valve 10. FIGS. 1A-1D will be discussed together. Hereinafter ball valve 10 can be interchangeable with ball valve assembly 10, assembly 10, or valve 10, and it is to be understood that each is referring to the representative ball valve 10 shown in FIGS. 1A-1D and described below.

Ball valve 10 is a fluid flow control device which uses a hollow pivoting ball (not shown) to control liquid flowing through ball valve 10. Ball valve 10 is open when an aperture through the ball is in line with the fluid flow and closed when the ball is pivoted 90-degrees by the valve handle, blocking the fluid flow. Ball valve 10 can be used in any fluid system that requires controlling the flow of fluid through a conduit. Previous ball valves require an operator to actuate the ball valve to the fully open and fully closed positions to allow or prevent, respectively, fluid flow through the valve. If an operator does not actuate the valve to the fully open or fully closed position, such that the valve is partially open and partially closed, fluid flow can suddenly close the valve and cause a pressure spike within the fluid system. A pressure spike is a rapid increase in pressure that is sent back through the fluid system, potentially damaging components of the fluid system such as a fluid pump, pressure sensors, valves, or other components of the fluid system. Ball valve 10 includes an improved spring to ensure ball valve 10 remains in the desired fully open and fully closed positions.

Ball valve 10 includes shaft 12, base 14, cover 16, first pin 18, second pin 20, handle 22, fasteners 24, and spring 26. Shaft 12 is coupled to base 14 of ball valve 10, and shaft 12 passes through conduit 28, which is the component of a fluid system which the fluid flows through. Ball valve 10 is in a fully open position when fluid is allowed to flow through ball valve 10 with the least amount of resistance. Ball valve 10 is in a fully closed position when fluid is blocked or prevented from flowing through ball valve 10. Conduit 28 includes first detent 30 and second detent 32 (FIG. 1D), which are catches, notches, or grooves that are configured to aid in securing ball valve 10 in the fully open and fully closed positions, discussed below. In the example shown, shaft 12 passes through conduit 28 and is coupled to the bottom surface of base 14.

Base 14 is the main rotating portion of ball valve 10 in which other components are coupled. In the example shown, base 14 has an irregular semi-circular shape, but in another embodiment, base 14 can have a generally circular shape or any other shape. Base 14 includes a plurality of apertures 34 extending fully through base 14. At least one of the plurality of apertures 34 is positioned adjacent a center of base 14, and the at least one of the plurality of apertures 34 is aligned with an aperture within shaft 12 such that a fastener can be used to couple base 14 to shaft 12. Base 14 being coupled to shaft 12 allows base 14 to rotate during actuation of ball valve 10 from the fully open position to the fully closed position, and vice versa. More specifically, base 14 is configured to rotate about an axis of ball valve 10 from the fully open position to the fully closed position, and vice versa. In some examples, base 14 can be constructed from a metallic material such as aluminum, aluminum bronze, steel, Inconel, and titanium, among other options. In other examples, base 14 can be constructed from a non-metallic material such as a composite or polymer-based material.

At least one of the plurality of apertures 34 extends fully through base 14 adjacent an outer edge of base 14. The apertures 34 adjacent the outer edge of base 14 are configured to receive fasteners 24 to secure cover 16 to base 14. Referring to FIG. 1A, cover 16 is a circular component that is configured to cover and protect the internal components of ball valve 10 from the environment. Fasteners 24 extend through apertures within cover 16 and fasteners 24 are coupled to apertures 34 adjacent the outer edge of base 14. Fasteners 24 allow cover 16 to be removed to access the internal components of ball valve 10. In the embodiment shown, fasteners 24 are a plurality of threaded bolts, screws, or the like. In another embodiment, fasteners 24 can be latches, locks, hooks, or other device capable of securing cover 16 to base 14. Because cover 16 is coupled to base 14, cover 16 rotates with base 14 during actuation of ball valve 10 from the fully open position to the fully closed position, and vice versa. In some examples, cover 16 can be constructed from a metallic material such as aluminum, aluminum bronze, steel, Inconel, and titanium, among other options. In other examples, cover 16 can be constructed from a non-metallic material such as a composite or polymer-based material.

Referring to FIG. 1B-1D, first pin 18 is coupled to conduit 28 and second pin 20 is coupled to base 14. First pin 18 and second pin 20 are positioned such that each extends perpendicularly outward from a top surface of base 14. First pin 18 and second pin 20 can each be metallic dowels that are secured to and extend outward from conduit 28 and base 14, respectively. In other words, each of first pin 18 and second pin 20 can be cylindrical rods constructed from a metallic material. In some examples, first pin 18 and second pin 20 can have the same length and same diameter. In other examples, first pin 18 and second pin 20 can have differing lengths and differing diameters. First pin 18 and second pin 20 can be coupled to conduit 28 and base 14, respectively, through one or more of a press-fitting operation, a welded joint, an adhesive, and a threaded connection, among other options. As such, first pin 18 and second pin 20 remain coupled to conduit 28 and base 14, respectively, during the actuation of ball valve 10.

In the embodiment shown, during the actuation of ball valve 10 from the fully open position to the fully closed position (or vice versa), first pin 18 remains fixed in location and does not rotate or translate to a different location with respect to shaft 12 or conduit 28. Further, in the embodiment shown, during the actuation of ball valve 10 from the fully open position to the fully closed position (or vice versa), second pin 20 translates with base 14 such that the location of second pin 20 changes with respect to conduit 28. In other words, when ball valve 10 is in the fully closed position, second pin 20 is at a first location with respect to conduit 28. When ball valve 10 is actuated from the fully closed position to the fully open position, second pin 20 translates with base 14 such that second pin 20 is moving with respect to conduit 28. When ball valve 10 is in the fully open position, second pin 20 is at a second location (different from the first location) with respect to conduit 28. As such, first pin 18 remains fixed in location during actuation of ball valve 10 and second pin 20 translates with respect to conduit 28 during actuation of ball valve 10. Likewise, base 14 and the coupled cover 16 rotate with respect to conduit 28 during actuation of ball valve 10.

Handle 22 is the component of ball valve 10 that an operator/user interacts with to actuate ball valve 10 from the fully open position to the fully closed position, and vice versa. Handle 22 is positioned adjacent base 14 and handle 22 is coupled to base 14. As shown best in FIGS. 1C-1D, handle 22 includes bolt 36 and second spring 38 positioned at least partially within an interior of handle 22. Bolt 36 and second spring 38 are also positioned at least partially within an interior of base 14. Bolt 36 is configured to interface with and engage second spring 38 and second spring 38 is configured to induce a force on bolt 36 to force bolt 36 inward toward a center of base 14. The inward force exerted by second spring 38 on bolt 36 causes bolt 36 to engage first detent 30 and second detent 32 of conduit 28 when handle 22 and bolt 36 are in the appropriate locations. Bolt 36 can be any bolt, pin, dowel, latch, bar, or other component configured to interface with first detent 30 and second detent 32 of bracket 12.

More specifically, when ball valve 10 is in the fully closed position, handle 22 is positioned perpendicular to conduit 28 and bolt 36 is engaging first detent 30. First detent 30 is a notch, groove, catch, or the like in which bolt 36 fits within, holding bolt 36 and handle 22 in the fully closed position. To transition ball valve 10 from the fully closed position to the fully open position, an operator pulls handle 22 outward away from base 14, causing second spring 38 with the attached bolt 36 to pull outward from first detent 30. The operator can then rotate handle 22 90 degrees to the fully open position, such that handle 22 is parallel and in line with conduit 28. The operator can then release handle 22, allowing second spring 38 to force bolt 36 inward toward a center of base 14 and into second detent 32. Second detent 32 is a notch, groove, catch, or the like in which bolt 36 fits within, holding bolt 36 and handle 22 in the fully open position. As such, bolt 36, second spring 38, first detent 30, and second detent 32 hold ball valve 10 in either the fully open or fully closed position and prevent ball valve 10 from changing positions without operator action. As such, bolt 36, second spring 38, first detent 30, and second detent 32 provide a safety measure to ensure ball valve 10 stays in the fully open or fully closed position, based on user input and action.

Figure 2A:
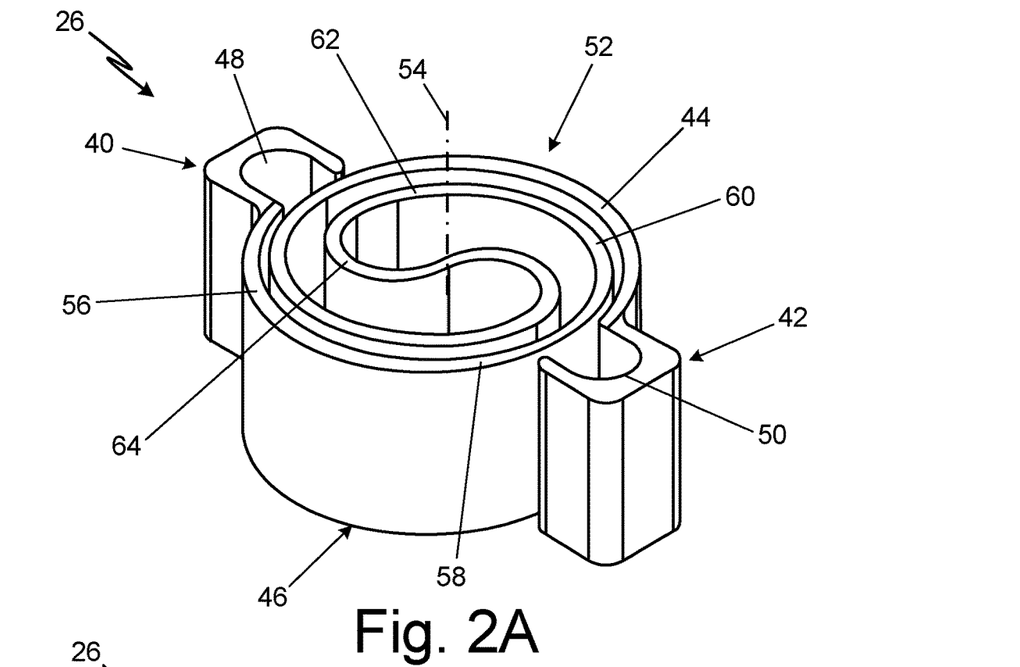
FIG. 2A is a perspective view of a spring of the representative ball valve.
Figure 2B:
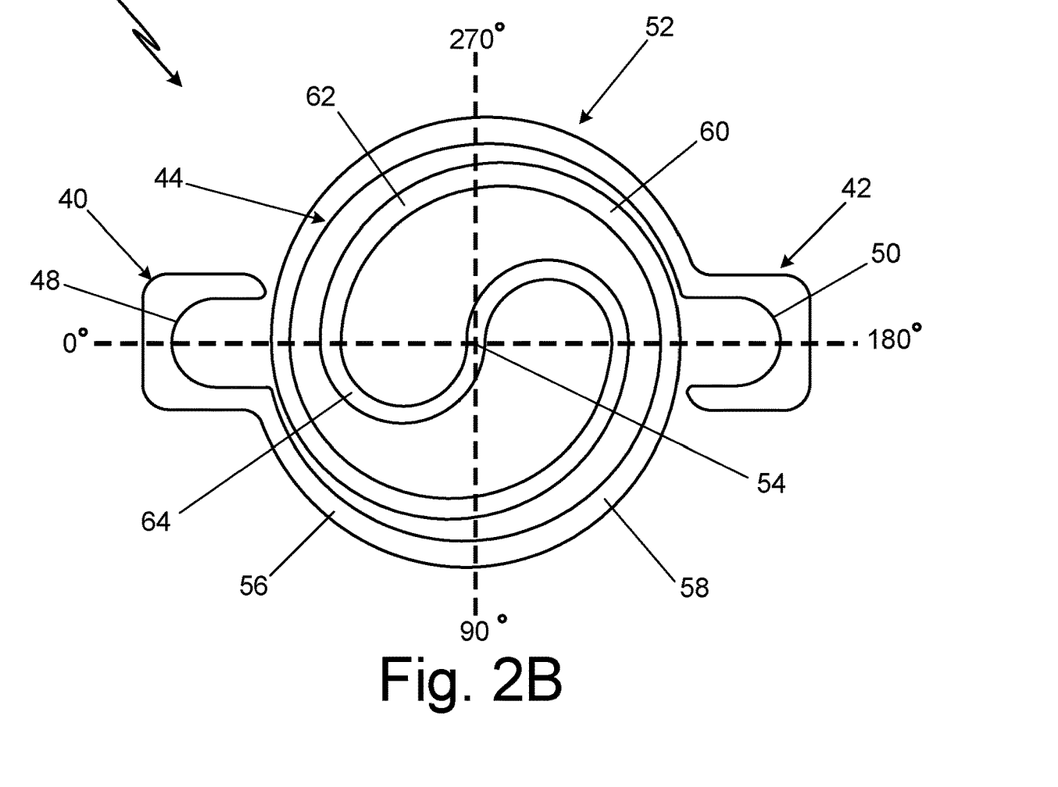
FIG. 2B is a top view of the spring of FIG. 2A.

Spring 26 is positioned between and coupled to both first pin 18 and second pin 20 of base 14. Spring 26 is a component of ball valve 10 that is configured to induce a force on first pin 18 and second pin 20 to aid in fully opening and fully closing ball valve 10. Further, spring 26 is configured to induce a force on first pin 18 and second pin 20 to keep ball valve 10 in the fully open or fully closed position, depending on the orientation of handle 22. FIG. 2A is a perspective view of spring 26 of ball valve 10. FIG. 2B is a top view of spring 26 of ball valve 10. FIGS. 2A-2B will be discussed together. Spring 26 includes first end 40, second end 42, top surface 44, bottom surface 46, first coupler 48, second coupler 50, continuous curved portion 52, and central axis 54. Further, continuous curved portion 52 includes first section 56, second section 58, third section 60, fourth section 62, and fifth section 64. In the embodiment shown, spring 26 is formed as a monolithic single-piece construction, meaning spring 26 is formed from a single piece of material. In other embodiments, spring 26 may not be formed as a monolithic single-piece construction. Further, spring 26 can be constructed from one or more of a titanium alloy, Inconel alloy, Hastelloy X alloy, Monel alloy, or other nickel-based superalloy, to name a few non-limiting examples. In other examples, spring 26 can be constructed from a non-metallic material such as a composite or polymer-based material.

First end 40 is a first side portion of spring 26, and second end 42 is a second side portion of spring 26 positioned on the opposite side of spring 26. Top surface 44 is the upper surface of spring 26 and bottom surface 46 is the lower surface of spring 26 positioned on the opposite side of spring 26. Referring to FIG. 1B, bottom surface 46 of spring 26 is adjacent upper surface of base 14. Top surface 44 and bottom surface 46 are flat surfaces that are offset from each other by a distance. As such, top surface 44 and bottom surface 46 are positioned parallel with each other. The distance between top surface 44 and bottom surface 46 is the height of spring 26. As shown in FIG. 2A, spring 26 has a constant height, meaning first coupler 48, second coupler 50, and continuous curved portion 52 have the same height across the entire length and width of spring 26.

First coupler 48 is positioned at first end 40 of spring 26 and second coupler 50 is positioned at second end 42 of spring 26. First coupler 48 is a curved feature of spring 26 that has a mating cross-section with first pin 18. As such, first coupler 48 is configured to accept first pin 18 such that first coupler 48 is coupled to first pin 18. Second coupler 50 is a curved feature of spring 26 that has a mating cross-section with second pin 20. As such, second coupler 50 is configured to accept second pin 20 such that second coupler 50 is coupled to second pin 20. In the embodiment shown, first coupler 48 has the same cross-sectional shape as second coupler 50. In another embodiment, first coupler 48 may have a different cross-sectional shape as second coupler 50.

Continuous curved portion 52 extends between and connects first coupler 48 to second coupler 50. Referring to FIG. 2B, continuous curved portion 52 has a generally circular outer cross-sectional shape when viewing from the top or bottom of spring 26. Therefore, continuous curved portion 52 includes central axis 54 extending through the center of continuous curved portion 52. Further, spring 26 has a complex internal shape that includes several curves and turns winding back and forth and connecting first coupler 48 to second coupler 50. More specifically, continuous curved portion 52 has a generally spiral shape extending from central axis 54 to each of first coupler 48 and second coupler 50.

Beginning at central axis 54, continuous curved portion 52 spirals in a first direction outward, continuously and gradually widening the curve before interfacing and connecting with first coupler 48. Likewise, beginning at central axis 54, continuous curved portion 52 spirals in a second direction outward, continuously and gradually widening the curve before interfacing and connecting with second coupler 50. As such, continuous curved portion 52 spirals outward from central axis 54 in both directions and each spiral is coupled to one of first coupler 48 or second coupler 50. The outward spirals of continuous curved portion 52 create and define a generally yin-yang shape (i.e., a circle divided into two teardrop shapes) between first coupler 48 and second coupler 50. In addition, the outward spirals of continuous curved portion 52 results in spring 26 being rotationally symmetric 180 degrees about central axis 54. In other words, spring 26 can be rotated 180 degrees about central axis 54 and spring 26 will appear exactly the same as before rotating spring 26 180 degrees.

Continuous curved portion 52 includes a plurality of sections positioned between first coupler 48 and second coupler 50. Continuous curved portion 52 includes first section 56, second section 58, third section 60, fourth section 62, and fifth section 64. First section 56 is positioned adjacent and coupled to second section 58. Second section 58 is positioned adjacent and coupled to third section 60. Third section 60 is positioned adjacent and coupled to fourth section 62. Fourth section 62 is positioned adjacent and coupled to fifth section 64. Sections 56, 58, 60, 62, and 64 are interconnected such that they create a continuous spiral curve from first coupler 48 to central axis 54, defining one half of continuous curved portion 52. Although not specifically described, the other half of continuous curved portion 52 has a substantially similar configuration and the discussion regarding one half of continuous curved portion 52 equally applies to the other half of continuous curved portion 52.

As shown in FIG. 2B, a coordinate system in which central axis 54 of continuous curved portion 52 is the origin (0,0 point) of the coordinate system can be used to further define sections 56, 58, 60, 62, and 64 of continuous curved portion 52. As shown, central axis 54 is the origin of the coordinate system, the negative X-axis is at 0 degrees, the negative Y-axis is at 90 degrees, the positive X-axis is at 180 degrees, and the positive Y-axis is at 270 degrees. As discussed, sections 56, 58, 60, 62, and 64 are interconnected such that they create a continuous spiral curve from first coupler 48 to central axis 54. More specifically, first section 56 extends between 0 degrees and 90 degrees, second section 58 extends between 90 degrees and 180 degrees, third section 60 extends between 180 degrees and 270 degrees, fourth section 62 extends between 270 degrees and 0 degrees, and fifth section 64 extends between 0 degrees and 90 degrees. As shown, the radius or diameter of each of sections 56, 58, 60, 62, and 64 gradually and continuously decrease progressing from first section 56 to fifth section 64. In other words, the radius or diameter of each of sections 56, 58, 60, 62, and 64 gradually and continuously decrease the close continuous curved portion 52 is to central axis 54.

Further, continuous curved portion 52 has a variable thickness between first coupler 48 and second coupler 50, meaning the thickness of the sections of continuous curved portion 52 vary or change progressing from first coupler 48 to second coupler 50. More specifically, a thickness of first section 56 increases progressing from 0 degrees to 90 degrees. A thickness of second section 58 decreases progressing from 90 degrees to 180 degrees. A thickness of third section 60 increases progressing from 180 degrees to 270 degrees. A thickness of fourth section 62 decreases progressing from 270 degrees to 0 degrees. Continuous curved portion 52 strategically has a variable thickness to maximize the energy stored within spring 26. The locations of continuous curved portion 52 that are thicker are locations with higher bending moments when spring 26 is in use within ball valve 10. The locations of continuous curved portion 52 that are thinner are locations with lower bending moments when spring 26 is in use within ball valve 10. Varying the thickness of continuous curved portion 52 based on the stress levels results in an optimized design which saves space and weight of spring 26 and the overall ball valve 10. Further, the locations of continuous curved portion 52 that are thinner contribute deflection to maintain the spring force during the actuation of ball valve 10 from the fully closed position to the fully open position, or vice versa.

Referring to FIGS. 1B-1D, to actuate ball valve 10 from the fully closed position to the fully open position an operator pulls handle 22 outward away from base 14, which in turn compresses the second spring 38 allowing bolt 36 to disengage first detent 30. The operator then rotates handle 22 90 degrees to align handle 22 with conduit 28 to allow fluid to flow through ball valve 10 and conduit 28. The operator releases handle 22 which causes second spring 38 to force bolt 36 inward toward a center of base 14, causing bolt 36 to engage and lock within second detent 32. During the transition from the fully closed position to the fully open position (and vice versa), spring 26 induces forces on first pin 18 and second pin 20. Spring 26 is shaped such that second coupler 50 is pulled away from first coupler 48 during actuation of ball valve 10. As such, the generally yin-yang shape of continuous curved portion 52 of spring 26 induces a force that pulls second pin 20 toward first pin 18. Spring 26 induces the pulling forces in an attempt to return to its relaxed configuration in which first pin 18 and second pin 20 are closest to each other. The distance between first pin 18 and second pin 20 is smallest when ball valve 10 is in the fully open or fully closed position. In contrast, the distance between first pin 18 and second pin 20 is largest halfway between the fully open and fully closed position. The relaxed configuration of spring 26 occurs at both the fully open position and the fully closed position. As such, spring 26 is configured to induce the pulling force on first pin 18 and second pin 20 when transitioning from the fully closed position to the fully open position, and vice versa.

The shape of spring 26 allows spring 26 to induce forces on first pin 18 and second pin 20 to facilitate the closing and opening of spring 26, depending on the position of handle 22. When handle 22 is in the fully closed position, spring 26 induces forces on first pin 18 and second pin 20 that pulls ball valve 10 toward the fully closed position. Spring 26 continues to induce forces on first pin 18 and second pin 20 that pulls ball valve 10 toward the fully closed position until handle 22 is rotated to about 35 degrees from the fully closed position. Between the angles of approximately 35 degrees and 55 degrees from the fully closed position, spring 26 is within a neutral zone in which spring 26 does not induce sufficient force towards either the fully open or fully closed position. Once spring 26 reaches approximately 55 degrees from the fully closed position, spring 26 induces forces on first pin 18 and second pin 20 that pulls ball valve 10 toward the fully open position. Spring 26 continues to induce forces on first pin 18 and second pin 20 that pulls ball valve 10 toward the fully open position until handle 22 is rotated back toward the fully closed position and passes the 55 degree point from the fully closed position. As such, depending on the angle of handle 22 from the fully closed position, spring 26 will induce forces on first pin 18 and second pin 20 that pulls ball valve 10 toward the fully open or fully closed position. The specific angles described above are for one embodiment of spring 26, it is to be understood that the specific angles will vary depending on the height, width, length, and thickness of spring 26.

Spring 26 guarantees that ball valve 10 remains locked in the fully open position and the fully closed position by inducing forces on first pin 18 and second pin 20, depending on the orientation of handle 22. Spring 26 eliminates operator mistake by pulling itself and ball valve 10 into the fully open position and the fully closed position. The maximum torque generated by spring 26 occurs at the fully open position and the fully closed position such that spring 26 acts as a lock, holding ball valve 10 in the desired fully open or fully closed position. As such, spring 26 is a redundant safety measure used along with first detent 30, second detent 32, and bolt 36 to lock ball valve 10 in the fully open and fully closed positions, preventing ball valve 10 from inadvertently switching from the fully open position to the fully closed position, or vice versa. Spring 26 used with ball valve 10 ensures that ball valve 10 remains in the desired position, preventing a pressure spike and damage to the overall fluid system.

Discussion of Possible Embodiments

The following are non-exclusive descriptions of possible embodiments of the present invention.

A ball valve comprising: a base with a first pin and a second pin extending perpendicular to a top surface of the base; a handle positioned adjacent and coupled to the base; and a spring comprising a first coupler, a second coupler, and a continuous curved portion extending between and connecting the first coupler to the second coupler, wherein the first coupler is coupled to the first pin and the second coupler is coupled to the second pin, and wherein the continuous curved portion has a variable thickness.

The ball valve of the preceding paragraph can optionally include, additionally and/or alternatively, any one or more of the following features, configurations and/or additional components:

The base is coupled to a shaft, and wherein the base is configured to rotate about an axis of the shaft during actuation of the ball valve.

A cover coupled to the base through a plurality of fasteners, wherein the cover rotates with the base during actuation of the ball valve.

A bolt and a second spring are positioned at least partially within the handle and at least partially within the base, and wherein the second spring forces the bolt toward a center of the base.

An end of the bolt engages at least one detent to secure the ball valve in a fully open and a fully closed position.

The first pin is coupled to a conduit and the second pin is coupled to the base.

The first pin remains stationary during actuation of the ball valve; and the second pin rotates with the base during actuation of the ball valve.

A distance between the first pin and the second pin is smallest when the ball valve is in a fully open or a fully closed position.

The spring induces a force on the first pin and the second pin, pulling the second pin toward the first pin during actuation of the ball valve from a fully closed position to a fully open position and during actuation of the ball valve from the fully open position to the fully closed position.

The continuous curved portion has a yin-yang shape, and wherein the spring is formed as a monolithic single-piece construction.

The following are further non-exclusive descriptions of possible embodiments of the present invention.

A spring for use in an assembly, the spring comprising: a first coupler positioned at a first end of the spring; a second coupler positioned at a second end of the spring; and a continuous curved portion extending between and connecting the first coupler to the second coupler, wherein the continuous curved portion has a variable thickness between the first coupler and the second coupler.

The spring of the preceding paragraph can optionally include, additionally and/or alternatively, any one or more of the following features, configurations and/or additional components:

A bottom surface positioned offset from a top surface, wherein the bottom surface is parallel with the top surface.

The first coupler, the second coupler, and the continuous curved portion have a constant height, and wherein the height is the distance between the bottom surface and the top surface of the spring.

The continuous curved portion comprises: a first section positioned adjacent and coupled to a second section; the second section is positioned adjacent and coupled to a third section; the third section is positioned adjacent and coupled to a fourth section; and the fourth section is positioned adjacent and coupled to a fifth section.

The first section extends between 0 degrees and 90 degrees with respect to a central axis of the continuous curved portion; the second section extends between 90 degrees and 180 degrees with respect to the central axis of the continuous curved portion; the third section extends between 180 degrees and 270 degrees with respect to the central axis of the continuous curved portion; the fourth section extends between 270 degrees and 0 degrees with respect to the central axis of the continuous curved portion; and the fifth section extends between 0 degrees and 90 degrees with respect to a central axis of the continuous curved portion.

A thickness of the first section increases from 0 degrees to 90 degrees; a thickness of the second section decreases from 90 degrees to 180 degrees; a thickness of the third section increases from 180 degrees to 270 degrees; and a thickness of the fourth section decreases from 270 degrees to 0 degrees.

The spring is rotationally symmetric 180 degrees about a central axis extending through a center of the continuous curved portion.

The spring is formed as a monolithic single-piece construction.

The spring is constructed from one or more of a titanium alloy, Inconel alloy, Hastelloy X, Monel, or other nickel-based superalloy.

The continuous curved portion has a yin-yang shape between the first coupler and the second coupler.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ball valve comprising:
   a base;
   a first pin configured to remain stationary during actuation of the ball valve;
   a second pin coupled to the base and extending perpendicular to a top surface of the base, wherein the second pin is configured to translate with the base during actuation of the ball valve;
   a handle positioned adjacent and coupled to the base; and
   a spring comprising a first coupler, a second coupler, and a continuous curved portion extending between and connecting the first coupler to the second coupler, wherein the first coupler is coupled to the first pin and the second coupler is coupled to the second pin;
   wherein the spring is configured to induce a force on the first pin and the second pin to pull the second pin in a first rotational direction when the ball valve is in a fully open position, and wherein the spring is configured to induce a force on the first pin and the second pin to pull the second pin in a second rotational direction when the ball valve is in a fully closed position.

2. The ball valve of claim 1, wherein the base is coupled to a shaft, and wherein the base is configured to rotate about an axis of the shaft during actuation of the ball valve.

3. The ball valve of claim 2 and further comprising a cover coupled to the base through a plurality of fasteners, wherein the cover rotates with the base during actuation of the ball valve.

4. The ball valve of claim 1, wherein a bolt and a second spring are positioned at least partially within the handle and at least partially within the base, and wherein the second spring forces the bolt toward a center of the base.

5. The ball valve of claim 4, wherein an end of the bolt is configured to engage a first detent to secure the ball valve in the fully closed position, and wherein the end of the bolt is configured to engage a second detent to secure the ball valve in the fully open position.

6. The ball valve of claim 1, wherein the first pin is coupled to a conduit.

7. The ball valve of claim 1, wherein:
   a distance between the first pin and the second pin is smallest when the ball valve is in a fully open or a fully closed position.

8. The ball valve of claim 1, wherein the spring induces a force on the first pin and the second pin to pull the second pin toward the first pin during actuation of the ball valve.

9. The ball valve of claim 1, wherein the continuous curved portion has a yin-yang shape, and wherein the spring is formed as a monolithic single-piece construction.

10. A spring for use in an assembly, the spring comprising:
    a first coupler positioned at a first end of the spring;
    a second coupler positioned at a second end of the spring; and
    a continuous curved portion extending between and connecting the first coupler to the second coupler, wherein the continuous curved portion has a variable thickness between the first coupler and the second coupler, and wherein the continuous curved portion comprises a spiral curve extending from the first coupler to a central axis of the spring, defining one half of the continuous curved portion;
    wherein the continuous curved portion comprises:
      a first section positioned adjacent and coupled to a second section, wherein the first section extends between 0 degrees and 90 degrees with respect to the central axis and a thickness of the first section increases from 0 degrees to 90 degrees;
      the second section is positioned adjacent and coupled to a third section, wherein the second section extends between 90 degrees and 180 degrees with respect to the central axis and a thickness of the second section decreases from 90 degrees to 180 degrees;
      the third section is positioned adjacent and coupled to a fourth section, wherein the third section extends between 180 degrees and 270 degrees with respect to the central axis and a thickness of the third section increases from 180 degrees to 270 degrees; and
      the fourth section is positioned adjacent and coupled to a fifth section, wherein the fourth section extends between 270 degrees and 0 degrees with respect to the central axis and the fifth section extends between 0 degrees and 90 degrees with respect to the central axis and a thickness of the fourth section decreases from 270 degrees to 0 degrees.

11. The spring of claim 10 and further comprising a bottom surface positioned offset from a top surface, wherein the bottom surface is parallel with the top surface.

12. The spring of claim 11, wherein the first coupler, the second coupler, and the continuous curved portion have a constant height, and wherein the height is the distance between the bottom surface and the top surface of the spring.

13. The spring of claim 10, wherein the spring is rotationally symmetric 180 degrees about the central axis.

14. The spring of claim 10, wherein the spring is formed as a monolithic single-piece construction.

15. The spring of claim 10, wherein the spring is constructed from one or more of a titanium alloy, Inconel alloy, Hastelloy X, Monel, and other nickel-based superalloy.

16. The spring of claim 10, wherein the continuous curved portion has a yin-yang shape between the first coupler and the second coupler.

\* \* \* \* \*